United States Patent
Kim et al.

(10) Patent No.: US 10,018,792 B2
(45) Date of Patent: Jul. 10, 2018

(54) EXTENSION DEVICE FOR TRANSCEIVER

(71) Applicant: KMW U.S.A., Inc., Fullerton, CA (US)

(72) Inventors: Byung In Kim, Anaheim, CA (US); Sang Cheon Park, Irvine, CA (US)

(73) Assignee: KMW U.S.A., Inc., Fullerton, CA (US)

( * ) Notice: Subject to any disclaimer, the term of this patent is extended or adjusted under 35 U.S.C. 154(b) by 0 days.

(21) Appl. No.: 15/284,949

(22) Filed: Oct. 4, 2016

(65) Prior Publication Data

US 2017/0115460 A1 Apr. 27, 2017

(30) Foreign Application Priority Data

Oct. 22, 2015 (KR) ........................ 10-2015-0147649

(51) Int. Cl.
*G02B 6/42* (2006.01)
(52) U.S. Cl.
CPC .......... *G02B 6/4256* (2013.01); *G02B 6/428* (2013.01); *G02B 6/4251* (2013.01); *G02B 6/4269* (2013.01); *G02B 6/4278* (2013.01)
(58) Field of Classification Search
CPC .. G02B 6/4251; G02B 6/4269; G02B 6/4278; G02B 6/4256; G02B 6/428
See application file for complete search history.

(56) References Cited

U.S. PATENT DOCUMENTS

| 8,319,118 | B2* | 11/2012 | Edwards | H05K 9/0058 |
| | | | | 174/377 |
| 8,879,267 | B2* | 11/2014 | Henry | H04L 12/6418 |
| | | | | 361/704 |
| 9,549,234 | B1* | 1/2017 | Mascitto | H04Q 11/0071 |
| 2010/0303465 | A1* | 12/2010 | Dahlfort | G02B 6/4201 |
| | | | | 398/115 |
| 2013/0094864 | A1* | 4/2013 | Duis | H04B 10/40 |
| | | | | 398/139 |
| 2016/0064873 | A1* | 3/2016 | Bucher | H01R 12/7076 |
| | | | | 385/88 |

FOREIGN PATENT DOCUMENTS

JP 2006-190584 A 7/2006

* cited by examiner

*Primary Examiner* — Mukund G Patel
(74) *Attorney, Agent, or Firm* — Harness, Dickey & Pierce, P.L.C.

(57) ABSTRACT

Some embodiments of the present disclosure provide a transceiver extension device. A transceiver extension device is provided for connection with an enclosure including a cage for a circuit board and a transceiver. The transceiver extension device includes an extension cage configured to accommodate the transceiver, an extension connector configured to be inserted into the cage of the enclosure, and an extension circuit board configured to transmit a signal of a second transceiver to the circuit board in the enclosure.

13 Claims, 9 Drawing Sheets

EXTENSION DEVICE FOR TRANSCEIVER

CROSS REFERENCE TO RELATED APPLICATIONS

The present application is based on, and claims priority from, Korean Patent Application Number 10-2015-0147649, filed Oct. 22, 2015, the disclosure of which is hereby incorporated by reference herein in its entirety.

TECHNICAL FIELD

The present disclosure in some embodiments relates to a transceiver extension device to be mounted on an optical communication transceiver I/O port.

BACKGROUND

The statements in this section merely provide background information related to the present disclosure and do not necessarily constitute prior art.

One type of the optical communication transceivers has an encasing structure with a light unit provided therein, including a light emitting element and a light receiving element, and is configured to be detachably attached into a cage mounted on a substrate. The cage has a substrate-mounted pluggable connector to which the optical transceiver can be connected, when the connection terminals of the optical transceiver make a connection with the optical transceiver. The optical transceiver module configured in this manner can perform the optical communication by interconverting optical and electrical signals.

MultiSource Agreement (MSA) defines the Small Form-factor Pluggable (SFP) optical communication transceiver shapes and dimensions and cages for accommodating the SFP transceivers. Such optical communication transceivers are manufactured based on a variety of standards that define module specifications for the purpose of miniaturization of electronic equipment for optical communications.

According to the SFP MSA standard, an optical communication transceiver is provided with a projecting latch formed on its lower surface, while the cage is provided with a spring plate having a latching hole adapted to engage the latch, so that the optical communication transceiver introduces its latch in the latching hole and secures itself to the cage during insertion into the cage.

For use in an optical communication transceiver 10 in an optical communication equipment represented by an enclosure 100 as shown in FIGS. 1 and 2, the enclosure 100 includes a cage 210 capable of receiving the transceiver 10 at a port. When guided by and introduced into the cage 210, the optical communication transceiver 10 establishes a connection with a circuit board 230 via a primary pluggable connector 220, so that optical communication signals proceed to a Field-Programmable Gate Array (FPGA) placed nearby the established connection. The cage 210 and the primary pluggable connector 220 may be structurally modified depending on the type of the optical communication transceiver.

The optical communication transceiver 10 may be properly operated at a temperature below 85° C. or risks a possible change in its product properties at 85° C. or higher. However, the optical communication transceiver 10 during its heat radiation is confined with heat remaining undissipated in the enclosure 100. Added to that is a direct heat transfer by the heat generated inside the enclosure 100 at, for example, the FPGA, resulting in a temperature rise of the transceiver 10.

Therefore, with such transceiver 10 located inside the casing 100 as in FIG. 1, the greater amount of heat transmitted to the optical communication transceiver 10 increase the risk of overheating transceiver 10 to 85° C. or higher. Otherwise, maintaining the optical communication transceiver below 85° C. will require more heat sink fins provided in the enclosure 100 which adds to the bulkiness of the enclosure 100.

SUMMARY

In accordance with some embodiments, the present disclosure provides a transceiver extension device for connection with an enclosure including a cage for a circuit board and a transceiver. The transceiver extension device includes an extension cage configured to accommodate the transceiver, an extension connector configured to be inserted into the cage of the enclosure, and an extension circuit board configured to transmit a signal of the transceiver to a second circuit board in the enclosure.

DETAILED DESCRIPTION

Figure 1:
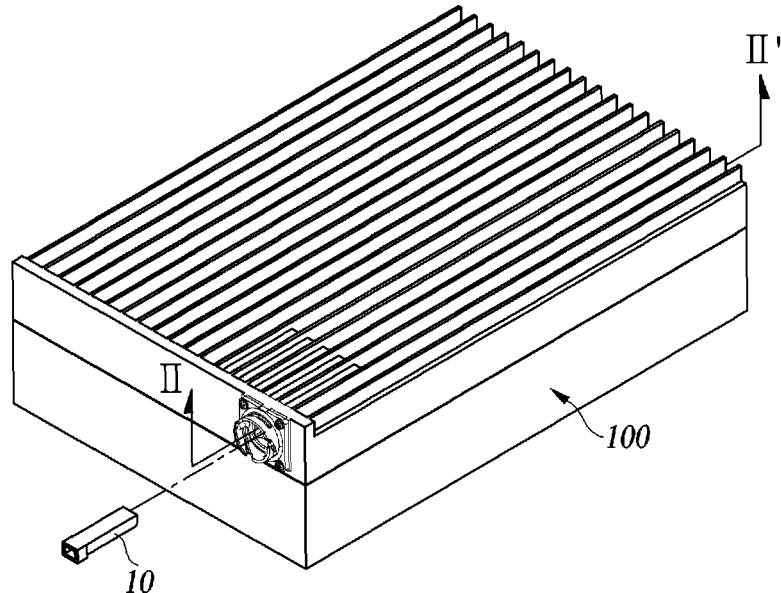
FIG. 1 is a perspective view of a conventional optical communication transceiver and an enclosure with an I/O port aligned along their line of connection.
Figure 2:
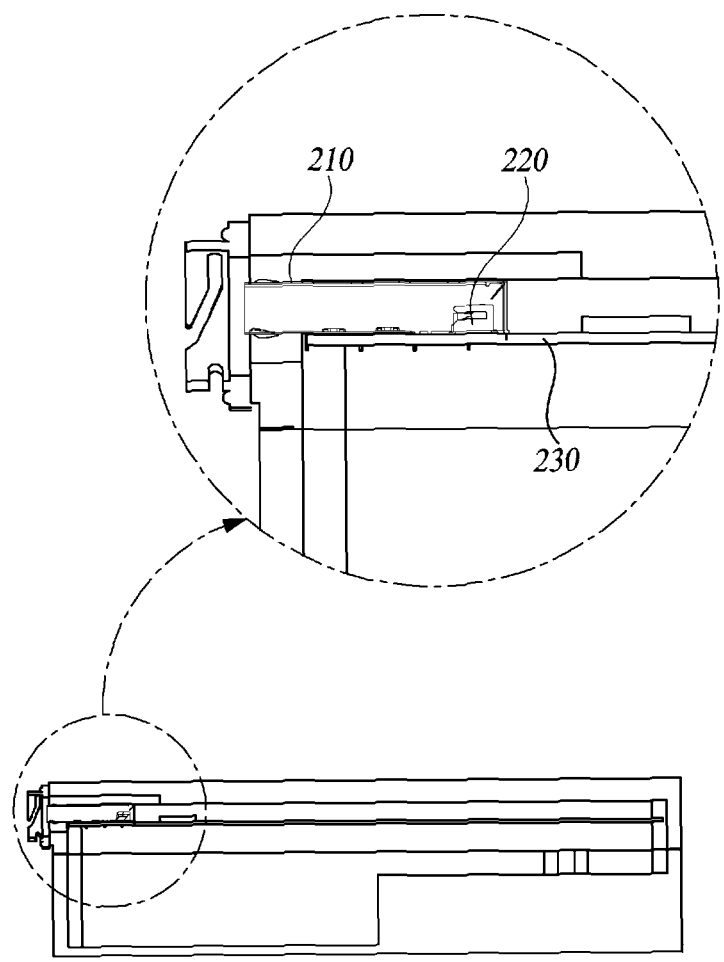
FIG. 2 is a cross-sectional view of the case in FIG. 1 taken along line II-II'.

The present disclosure in some embodiments seeks to provide a transceiver extension device for use in a wireless communication system having an optical communication port, which maintains a lower temperature of an optical communication transceiver in operation and receives less influence from the temperature inside an enclosure.

The present disclosure in some embodiments seeks to provide a transceiver extension device for exteriorizing the transceiver from the enclosure and thereby provide a stable operation of the transceiver without having to make the enclosure bulkier.

In the following description, like reference numerals designate like elements, although the elements are shown in different drawings. Further, in the following description of the at least one embodiment, a detailed description of known functions and configurations incorporated herein will be omitted for the purpose of clarity and for brevity.

Additionally, in describing the components of the present disclosure, terms like first, second, i, ii, (a) and (b) are used. These are solely for the purpose of differentiating one component from another, and one of ordinary skill would understand the terms are not to imply or suggest the substances, the order or sequence of the components. Throughout this specification, when a part "includes" or "comprises" a component, unless there is a particular description contrary thereto, the part can further include other components, not excluding the other components.

Hereinafter, a transceiver extension device according to at least one embodiment of the present disclosure will be described in detail with reference to the accompanying drawings.

Figure 3:
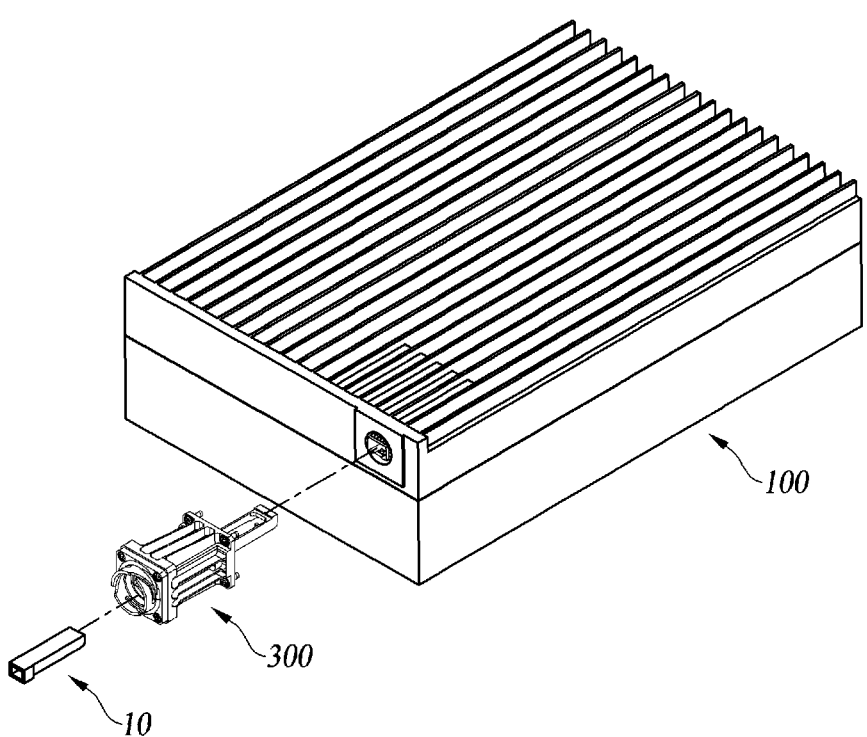
FIG. 3 is a perspective view of an optical communication transceiver, an extension device for the transceiver and an enclosure aligned along their line of connection, according to at least one embodiment of the present disclosure.

FIG. 3 is a perspective view of an optical communication transceiver, an extension device for the transceiver and an enclosure aligned along their line of connection, according to at least one embodiment of the present disclosure.

A transceiver extension device 300 is adapted to plug itself into the cage 210 of the enclosure 100 that receives the transceiver 10. Extending from the cage 210, the transceiver extension device 300 receives the transceiver 10 when inserted and maintains the transceiver 10 outside the enclosure 100.

This helps prevent the transceiver 10 from subjecting to a direct influence of heat generated in the enclosure 100 and convect the generated heat from the enclosure 100 and thereby eliminate issues that occur due to the temperature rise.

Figure 4:
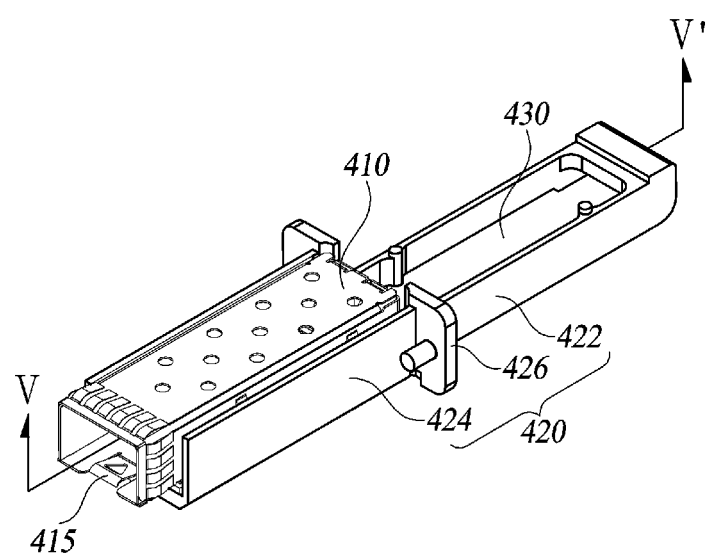
FIG. 4 is a perspective view of a transceiver extension device according to at least one embodiment.

The transceiver extension device 300 is configured to preoccupy the receptive space for the transceiver 10 in the enclosure 100, for which the transceiver extension device 300 has an extension connector 420 which is formed and sized similar to the standardized transceiver 10, as illustrated in FIG. 4.

Moreover, to accommodate the transceiver 10, the transceiver extension device 300 has an extension cage 410 which receives the transceiver 10 and is formed with a space dimensioned similar to the cage 210 of the enclosure 100.

Figure 5:
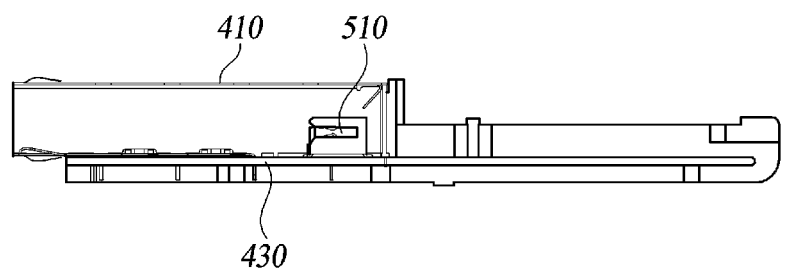
FIG. 5 is a cross-sectional view of the transceiver extension device in FIG. 4 taken along line V-V'.
Figure 6:
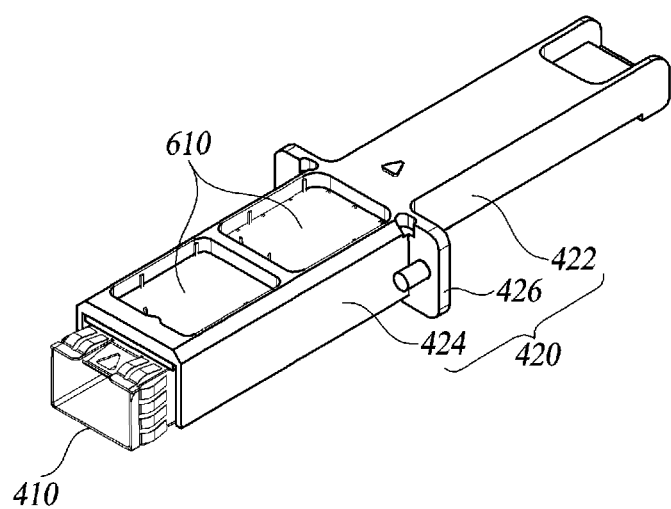
FIG. 6 is a bottom perspective view of a transceiver extension device according to at least one embodiment.

FIGS. 4 to 6 are perspective views and a cross-sectional view the transceiver extension device according to at least one embodiment of the present disclosure.

As illustrated in FIGS. 4 to 6, the transceiver extension device includes an extension connector 420 and an extension circuit board 430.

To provide a room for introducing the standardized transceiver 10, the extension cage 410 is sized and formed similar to the cage 210 in the enclosure 100. The structure of the extension cage 410 may be modified according to the type of the optical communication transceiver.

The extension cage 410 includes a secondary pluggable connector 510 for making an electrical connection with the inserted transceiver 10. An extension circuit board 430 is provided on the bottom surface of the extension cage 410 and is connected to the secondary pluggable connector 510.

When inserted into the extension cage 410 under guidance therefor, the optical communication transceiver 10 establishes an electrical connection with the extension circuit board 430 via the secondary pluggable connector 510.

As with the cage 210 in the enclosure 100, the optical communication transceiver 10 has a latch (not shown) to be engaged with the extension cage 410 at its latch hole 415 when the transceiver 10 is inserted into the extension cage 410 and locked in place.

The extension circuit board 430 transmits a signal from the transceiver 10 to the circuit board 230 in the enclosure 100.

With the secondary pluggable connector 510 mounted on the extension circuit board 430, the extension cage 410 accepts the optical communication transceiver 10 and thereby allows its internal pluggable connector 510 to connect with the transceiver 10 at the connection terminals thereof. A subsequent insertion of such transceiver extension device 300 into the enclosure 100 allows the extension circuit board 430 to connect itself to the primary pluggable connector 220 inside of the enclosure 100, so as to transmit the signals from the transceiver 10 to the circuit board 230 in the enclosure 100.

The extension connector 420, which constitutes the internal skeleton of the transceiver extension device 300, includes an insertion portion 422, a base portion 424 and a housing mount 426.

The insertion portion 422 of the extension cage 410 is to be inserted and lodged in the cage 210 of the enclosure 100, and therefore it is fabricated to have an appropriate size and shape therefor. This generally conforms to different standards for defining the specifications of the optical transceiver module towards the miniaturization of the optical communication electronics for use with the module.

The base portion 424 is adapted to be fixedly coupled with the extension cage 410 and to envelop the left and right sides and the bottom of the extension cage 410. In this case, the extension circuit board 430 will be located between the extension cage 410 and the base portion 424. However, the bottom of the base portion 424 may be voided at one or more holes 610 for installing a thermal pad material 810 on the lower side of the extension cage 410, as will be described in detail referring to FIG. 8.

The housing mount 426 is to fixedly engage a housing 700 which is mounted externally of the extension cage 410, as described below referring to FIG. 7. The housing mount 426 is illustrated in the drawing as positioned and protruding between the base portion 424 and the insertion portion 422, although it can be modified to have various positions and form factors as long as it serves to fixedly mount the housing 700.

The extension circuit board 430 located under the extension cage 410 extends from the base portion 424 of the extension connector 420 to the insertion portion 422. Therefore, when the extension connector 420 is inserted into the cage 210 inside the enclosure 100, the extension circuit board 430 is connected with the primary pluggable connector 220 in the enclosure 100, so that the signals from the optical communication transceiver 10 are transmitted to the circuit board 230 in the enclosure 100.

Figure 7:
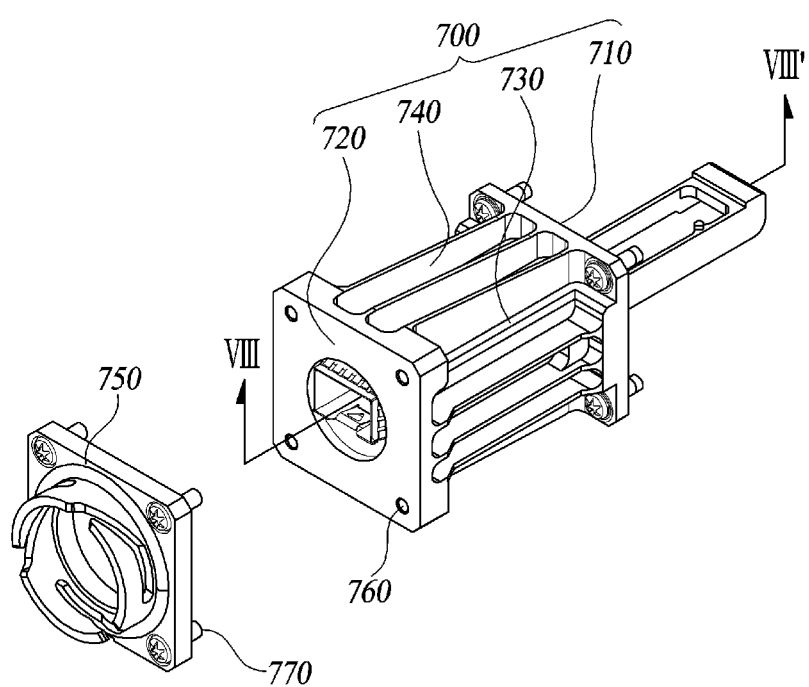
FIG. 7 is a perspective view of a transceiver extension device including a housing, according to at least one embodiment.
Figure 8:
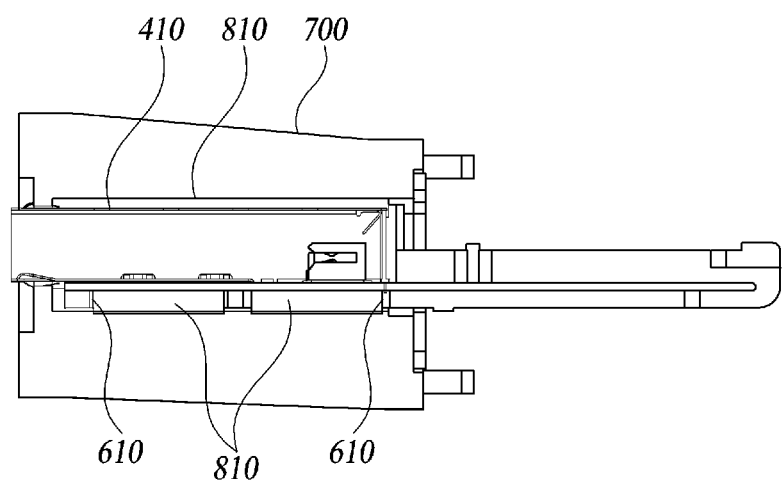
FIG. 8 is a cross-sectional view of the transceiver extension device in FIG. 7 taken along line VIII-VIII'.
Figure 9:
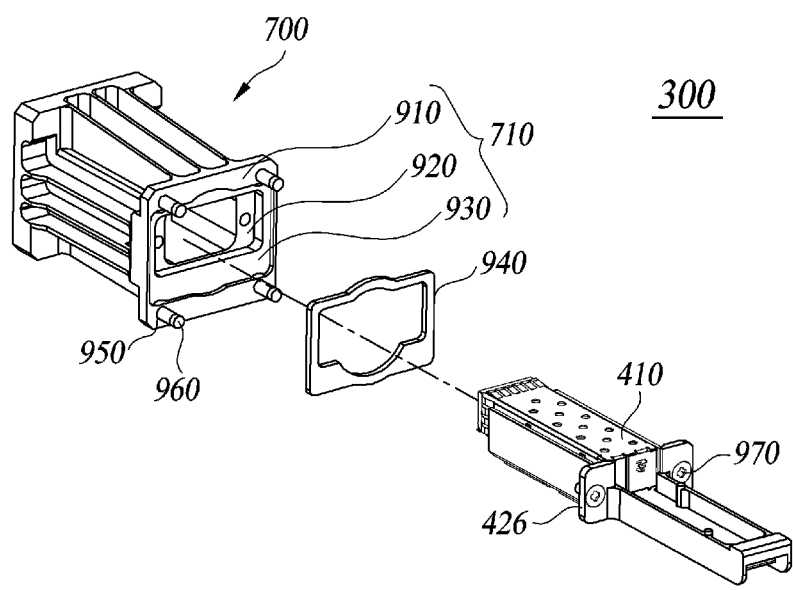
FIG. 9 is an exploded perspective view of a transceiver extension device including a housing, a waterproof gasket and an extension cage, according to at least one embodiment.

FIGS. 7 to 9 illustrate a transceiver extension device including a housing, according to at least one embodiment of the present disclosure.

As illustrated, the optical transceiver extension device 300 may further include a housing 700 located outside the extension cage 410.

The housing 700 encloses the extension cage 410 and the base portion 424 of the extension connector 420 in order to protect the transceiver 10 and the extension cage 410 against shocks and pressures from the outside.

The housing 700 has a first side 710 which faces the enclosure 100 at the outside when the extension connector 420 of the transceiver extension device 300 is inserted into the enclosure 100. The periphery of the first side 710 is provided with a first abutting surface 910 to meet with the enclosure 100. The first abutting surface 910 has at least one fastener hole 950 which receives a fastening screw 960 for fixedly coupling the transceiver extension device 300 to the enclosure 100.

As shown in FIG. 9, the first side 710 may further include a second abutting surface 920 to meet with the housing mount 426 and a third abutting surface 930 to which a waterproof gasket 940 is coupled. With the transceiver extension device 300 coupled to the enclosure 100, the waterproof gasket 940 interposed between the first side 710 and the enclosure 100 protects the enclosure 100 against an inflow of external moisture.

At the second abutting surface 920, the housing mount 426 is fixed to the housing 700 with a fastening means such as a screw 970.

Opposite to the first side 710 is a second side 720, to which a waterproof connector 750 is affixed. The second side 720 also has at its periphery one or more fastener holes 760 aligned with the counterparts of the waterproof connector 750 for allowing the latter to be fastened to the second side 720 by using a screw 770.

When a cable is interconnected with the transceiver extension device 300, the waterproof connector 750 therebetween serves to stop an inflow of external moisture into the transceiver extension device 300.

The housing 700 further has a circumferential surface 730 which is configured to envelope the extension cage 410 as well as the periphery of the base portion 424 of the extension connector 420, externally release heat that has been generated by the transceiver 10 and transferred to the extension cage 410, and protect the extension cage 410 from the atmosphere. Further, the circumferential surface 730 may include a plurality of heat sink fins 740 for releasing heat from the extension cage 410 efficiently and for increasing the rigidity of the housing 700.

Each of the heat sink fins 740 has a thin plate shape and extends from the circumferential surface 730 along the periphery of the circumferential surface 730. Each heat sink fin 740 spans between the first side 710 and the second side 720, and the heat sink fins 740 extend from the circumferential surface 730 appropriately to the common heights of the first side 710 and the second side 720.

Heat sink fins 740 can effectively release heat generated by the transceiver 10 by expanding the external surface of the housing 700. Further, the placement of the heat sink fins 740 between the first side 710 and the second side 720 in all directions along the circumferential surface 730 substantially increases the strength of the entire housing 700 to resist deformation even when subjected to forces such as pressure or torsion from the outside so as to securely protect the extension cage 410.

In some embodiments, the housing 700 is made of aluminum or magnesium material having good thermal conductivity to promote dissipation of the heat generated by the transceiver 10.

The transceiver extension device 300 further includes the aforementioned thermal pad material 810 for facilitating the external release of the heat generated by the transceiver 10, as shown in FIG. 8. The thermal pad material 810 is disposed between the extension cage 410 and the housing 700 to better transfer the heat from the transceiver 10 to the housing 700.

According to some embodiments of the present disclosure and as shown in FIG. 8, the thermal pad material 810 is provided in the one or more holes 610 as well as on top of the extension cage 410. Then, the thermal pad 810 is in contact with extension cage 410 and the housing 700, and thereby transfers the heat generated by the transceiver 10 to the housing 700.

According to some embodiments as described above, circumventing a direct mounting of the transceiver 10 inside the enclosure 100 by using the transceiver extension device 300 precludes a direct transmission of heat generated in the enclosure 100 to the transceiver 10. In addition, the transceiver 10 is operatively inserted in the extension device 300 outside the enclosure 100 to facilitate expelling heat generated by the transceiver 10.

Therefore, the temperature of the transceiver 10 attached to the extension device 300 is measured to be 7° C. or more cooler than when it is mounted inside the enclosure 100. The transceiver 10 mounted in the extension device 300 can easily be maintained below 85° C., so as to keep the characteristics of the transceiver 10 intact throughout its operation.

According to some embodiments of the present disclosure, the transceiver exteriorized from the enclosure with the transceiver extension device is maintained at a significantly lower temperature than in the enclosure, so that it can operate stably.

In addition, the transceiver extension device is equipped with waterproof means such as the waterproof gasket and the waterproof connector for blocking the inflow of external moisture.

Exemplary embodiments in this disclosure and drawings are intended to illustrate rather than to limit the technical idea of the present disclosure. The exemplary embodiments of the present disclosure have been described for the sake of brevity and clarity. Accordingly, one of ordinary skill would understand the scope of the claimed disclosure is not to be limited by the explicitly described above embodiments but by the claims and equivalents thereof.

What is claimed is:

1. A transceiver extension device for connecting a transceiver to an enclosure, the enclosure including an enclosure cage with an enclosure circuit board therein, the transceiver extension device comprising:
   an extension cage configured to accommodate the transceiver;
   an extension connector including an insertion portion configured to be inserted into the enclosure cage, and a base portion configured to surround at least three sides of the extension cage to engage and fix the extension cage;
   an extension circuit board configured to transmit a signal of the transceiver to the enclosure circuit board;
   a housing including a first side which faces opposite to the enclosure, a second side located opposite to the first side, and a circumferential surface configured to envelope the extension cage as well as the periphery of the base portion of the extension connector;
   wherein the extension connector further includes a housing mount configured to fixedly engage the housing.

2. The transceiver extension device of claim 1, wherein the extension circuit board is configured to have a pluggable connector in an electrical connection, and
   wherein the pluggable connector is disposed inside the extension cage and is configured to be connected to the transceiver.

3. The transceiver extension device of claim 1, wherein the base portion of the extension connector envelopes the left and right sides and the bottom of the extension cage, and wherein the extension circuit board is located under the extension cage and between the extension cage and the base portion.

4. The transceiver extension device of claim 1, wherein the extension circuit board extends from the base portion to the insertion portion so as to deliver a signal of the transceiver to the enclosure circuit board.

5. The transceiver extension device of claim 1, wherein the first side is coupled with a waterproof gasket which is interposed between the first side and the enclosure when the transceiver extension device is coupled to the enclosure.

6. The transceiver extension device of claim 1, wherein the housing comprises a plurality of heat sink fins extending externally of the circumferential surface.

7. The transceiver extension device of claim 6, wherein the plurality of heat sink fins span between the first side and the second side.

8. The transceiver extension device of claim 1, wherein the housing is formed of an aluminum material.

9. The transceiver extension device of claim 1, wherein the housing is formed of a magnesium material.

10. The transceiver extension device of claim 1, further comprises a thermal pad material provided between the extension cage and the housing.

11. The transceiver extension device of claim 9, wherein the base portion of the extension connector comprises one or more bottom holes, and
wherein the thermal pad material is provided in the one or more bottom holes as well as on top of the extension cage.

12. The transceiver extension device of claim 1, further comprising a waterproof connector affixed to the second side.

13. A transceiver extension device for connecting a transceiver to an enclosure, the transceiver extension device comprising:
an extension cage configured to receive the transceiver within the extension cage, the extension cage having a first width;
an extension connector including:
an insertion portion configured to be inserted into an enclosure cage of the enclosure; and
a base portion with the extension cage affixed thereto, the base portion has a second width that is greater than the first width of the extension cage to receive the extension cage such that the base portion surrounds at least three sides of the extension cage; and
an extension circuit board included with the insertion portion, the extension circuit board configured to transmit a signal of the transceiver to an enclosure circuit board of the enclosure;
a housing including a first side which faces opposite to the enclosure, a second side located opposite to the first side, and a circumferential surface configured to envelope the extension cage as well as the periphery of the base portion of the extension connector;
wherein the extension connector further includes a housing mount configured to fixedly engage the housing.

* * * * *